(12) United States Patent
Pell et al.

(10) Patent No.: US 7,731,301 B2
(45) Date of Patent: Jun. 8, 2010

(54) ADJUSTABLE WIDTH DRIVE AXLE AND DRIVE UNIT

(75) Inventors: David Pell, Alpha, MN (US); John Peterson, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 163 days.

(21) Appl. No.: 11/686,399

(22) Filed: Mar. 15, 2007

(65) Prior Publication Data

US 2008/0224531 A1    Sep. 18, 2008

(51) Int. Cl.
*B60B 37/00* (2006.01)
*B60K 23/00* (2006.01)

(52) U.S. Cl. .................. 301/128; 301/6.5; 301/35.629; 180/340

(58) Field of Classification Search ............ 301/111.01, 301/122, 111.03–111.06, 124.1, 126, 128, 301/131–132, 35.628, 35.629, 35.631, 36.1, 301/130, 6.5; 180/340
See application file for complete search history.

(56) References Cited

U.S. PATENT DOCUMENTS

| | | | | |
|---|---|---|---|---|
| 1,822,093 A * | 9/1931 | Hendrickson et al. | ....... | 180/340 |
| 2,302,570 A * | 11/1942 | Peterson | ..................... | 180/340 |
| 2,722,988 A * | 11/1955 | Kuhary et al. | ............... | 180/340 |
| 2,804,157 A * | 8/1957 | Preston | ....................... | 180/340 |
| 2,819,117 A * | 1/1958 | Glazier, Jr. | ..................... | 301/1 |
| 2,885,018 A * | 5/1959 | Jackson | ...................... | 180/340 |
| 3,315,757 A * | 4/1967 | Schlosser | .................... | 180/340 |
| 5,005,913 A * | 4/1991 | Kittle et al. | ................. | 301/128 |
| 5,328,252 A * | 7/1994 | Thompson | ............. | 301/64.305 |
| 5,785,391 A * | 7/1998 | Parry et al. | ............ | 301/111.04 |
| 6,238,009 B1 * | 5/2001 | Lovitt, Jr. | .............. | 301/35.629 |
| 6,609,765 B2 * | 8/2003 | Radke et al. | ................. | 301/128 |
| 6,685,275 B2 * | 2/2004 | Gorges et al. | .......... | 301/35.629 |

\* cited by examiner

*Primary Examiner*—Jason R Bellinger
(74) *Attorney, Agent, or Firm*—Hovey Williams LLP

(57) ABSTRACT

Disclosed herein is an adjustable width drive axle including: a main axle body including a telescoping portion disposed at each end of the main axle body; a sprocket affixed to each end of the main axle body, the sprocket designed to engage a drive unit; a first spacer removably affixed to the sprocket, the first spacer disposed around the telescoping portion of the main axle body; and a hub removably affixed to an end of the first spacer opposite the sprocket, wherein one or more additional spacers may be interposed between the first spacer and the hub or between the sprocket and the first spacer to adjust the width of the axle.

11 Claims, 2 Drawing Sheets

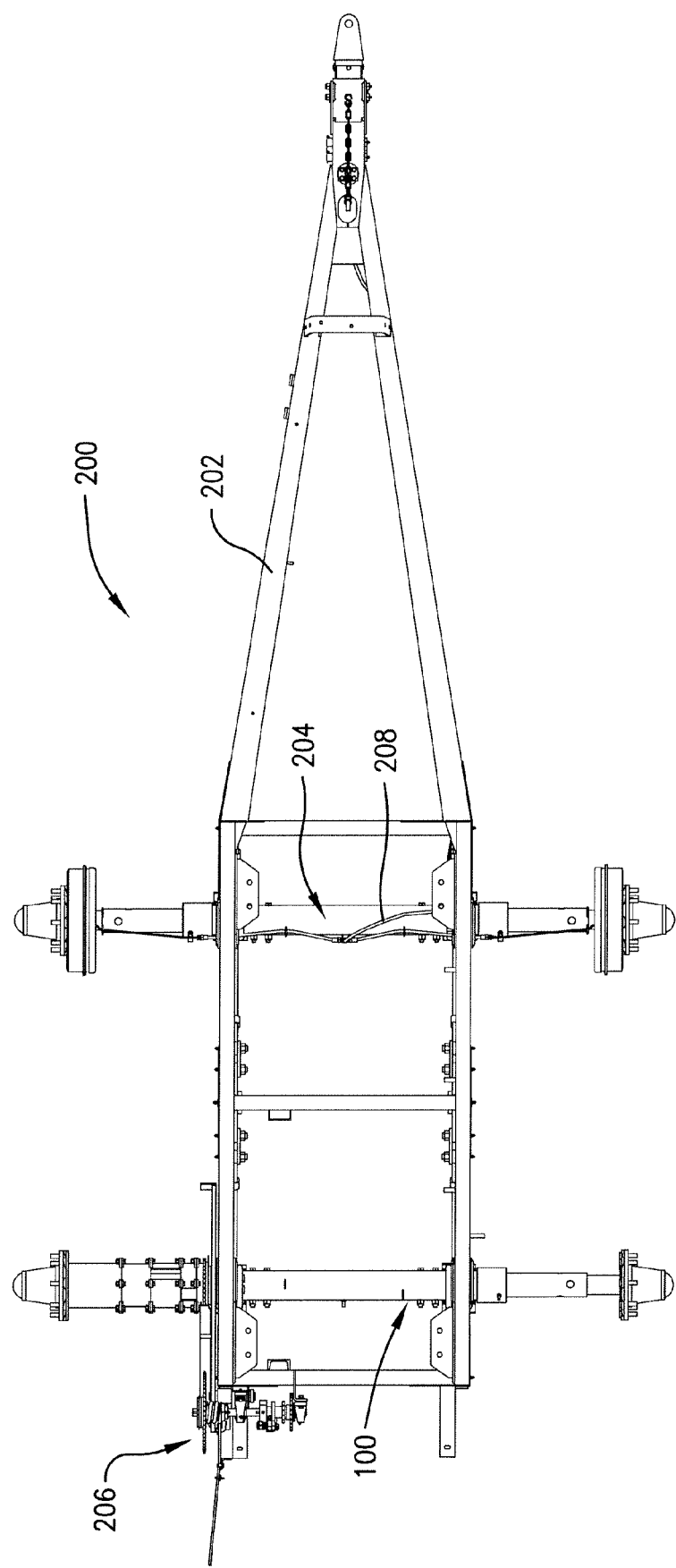

ADJUSTABLE WIDTH DRIVE AXLE AND DRIVE UNIT

BACKGROUND OF THE INVENTION

1. Field of the Invention

The present invention relates to a drive unit for use with an adjustable width drive axle.

2. Description of Related Art

A crop sprayer is a machine that includes a storage tank for storing chemical such as herbicides, pesticides, and fertilizers that are to be sprayed onto crops that are growing in a farm field. The chemical within the storage tank is sprayed onto the crops growing in the field by use of a nozzle assembly secured to a number of booms as the crop sprayer is advanced along the rows of the field.

Preferably, the crop sprayer should be able to operate in a number of varying field conditions. For example, the distance between rows of plants varies from field to field. Accordingly, it is desirable to provide a crop sprayer that is capable of adjusting the distance between its two right wheels and its two left wheels to allow the crop sprayer to move down the rows associated with the field without damaging or destroying the crops. In order to accommodate this need, crop sprayers have been designed with adjustable-width axle assemblies. However, the current designs of adjustable-width axle assemblies have a number of drawbacks. For example, adjustable-width axle assemblies are relatively mechanically complex and include a relatively large number of components thereby increasing the costs associated with manufacture and operation of the crop sprayer. Moreover, certain adjustable-width axle assemblies are susceptible to mechanical failure thereby reducing the useful life of a number of the components associated with the crop sprayer.

It should be appreciated that the crop sprayer must also be configured to easily and efficiently traverse varying surface topography when being operated in the field. For example, due to the long boom arms which crop sprayers require in order to cover many rows of crops with a single pass, a small change in the angle at which the chassis of the crop sprayer is oriented results in a large height change at the end of the boom arm thereby reducing crop clearance of the lowered boom arm. Crop damage may occur if the boom arms sway back and forth across a relatively large distance as the crop sprayer encounters varying surface topography or if the boom arms are significantly moved upwardly and downwardly as the crop sprayer executes a turn. Moreover, the environment in which the crop sprayer is operated, a farm field, is particularly prone to having varying surface topography.

What is needed therefore is an adjustable width axle drive and drive unit that overcomes one or more of the above-mentioned drawbacks. What is further needed is an adjustable-width axle assembly that can be quickly and easily utilized to change the operational width of the drive axle.

BRIEF SUMMARY OF THE INVENTION

Briefly, described herein is an adjustable width drive axle comprising: a main axle body including a telescoping portion disposed at each end of the main axle body; a sprocket affixed to each end of the main axle body, the sprocket designed to engage a drive unit; a first spacer removably affixed to the sprocket, the first spacer disposed around the telescoping portion of the main axle body; and a hub removably affixed to an end of the first spacer opposite the sprocket, wherein one or more additional spacers may be interposed between the first spacer and the hub or between the sprocket and the first spacer to adjust the width of the axle.

Also disclosed herein is a method for adjusting a width of a drive axle including: providing a main axle body with a telescoping end portion; affixing a sprocket, designed to engage a main drive unit, to the main axle body; affixing a first spacer to the sprocket, the first spacer disposed around the telescoping end portion of the main axle body; and affixing a hub to the first spacer, wherein affixing the first spacer adjusts the width of the drive axle.

These and other objects, features and advantages of the present invention will become more apparent upon reading the following specification in conjunction with the accompanying drawing figures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates a schematic view of a frame of a vehicle including an adjustable width drive axle, of FIG. 1, in accordance with exemplary embodiments of the present invention.

Figure 1:
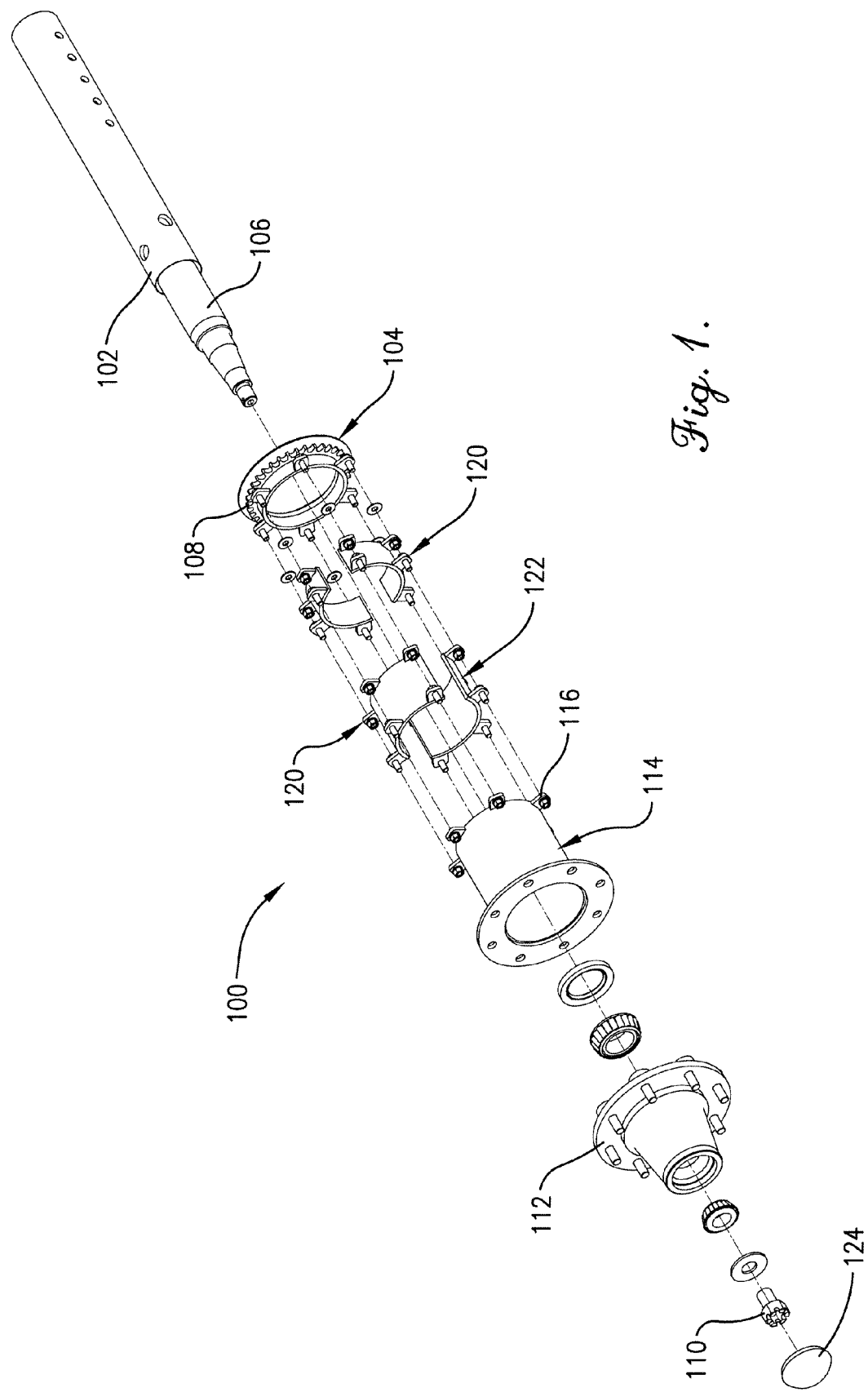
FIG. 1 illustrates a schematic view of an adjustable width drive axle in accordance with exemplary embodiments of the present invention.

The detailed description explains the preferred embodiments of the invention, together with advantages and features, by way of example with reference to the drawings.

DETAILED DESCRIPTION OF THE INVENTION

Disclosed herein is an adjustable width drive axle comprising: a main axle body including a telescoping portion disposed at each end of the main axle body; a sprocket affixed to each end of the main axle body, the sprocket designed to engage a drive unit; a first spacer removably affixed to the sprocket, the first spacer disposed around the telescoping portion of the main axle body; and a hub removably affixed to an end of the first spacer opposite the sprocket, wherein one or more additional spacers may be interposed between the first spacer and the hub or between the sprocket and the first spacer to adjust the width of the axle.

Referring now to FIG. 1, is a schematic illustration of a portion of an adjustable width drive axle 100 in accordance with exemplary embodiments. The adjustable width drive axle 100 includes main body 102 and a sprocket 104 that is slidably disposed on the main body 102. The sprocket 104 is designed to rotate freely about the main body 102 and engage a drive unit that provides torsional energy to the sprocket 104. In one exemplary embodiment, the sprocket 104 includes a plurality to teeth 108 that are designed to engage a drive chain that is also coupled to a drive unit.

The end of the body 102 includes a telescoping assembly 106 that allows the length of the main body 102 to be adjusted by a user. The distal end of the telescoping assembly 106 uses a nut 110, or other attachment device, to affix to a wheel hub 112. The wheel hub 112 is designed such that a wheel can be removably affixed to the wheel hub 112. The wheel hub 112 is part of a hub assembly, which also includes a wheel hub mount 114. The wheel hub 112 and hub mount 114 are affixed to one another. The wheel hub mount 114 that includes a plurality of radially extending tabs 116. Each tab 116 includes an aperture suitable to receive a bolt, or other attachment device. The wheel hub mount 114, through the tabs 116, is designed to be affixed to a spacer 120 or the sprocket 104. The nut 110 may be covered by a nut cover 124 to protect the nut 110.

In exemplary embodiments, one or more spacers 120 may affix the wheel hub mount 114 to the sprocket 104. Both ends of the spacers 120 include a plurality of extending tabs 122 suitable to receive a bolt, or other attachment device, to affix the spacer 120 to the wheel hub mount 114, the sprocket 104, or another spacer 120. The spacers 120 can have a variety of lengths and are interposed in-between the sprocket 104 and the wheel hub mount 114. The spacers 120 are each comprised of two semi-tubular plates that are designed to completely encase the telescoping assembly 106 of the main axle body 102.

The spacers 120 couple the sprocket 104 to the wheel hub mount 114 and transfer the rotational energy provided to the sprocket 104 from the drive unit to the wheel hub mount 114. Accordingly, the spacers 120 are constructed from a suitably rigid and durable material such as steel, aluminum, titanium, or the like. Furthermore, when more than one spacer 120 is used the spacers may be placed in an offset position from one another. In other words, the two semi-tubular pieces of the spacers 120 may not be lined up axially around the telescoping assembly 106.

Turning now to FIG. 2, a schematic of a vehicle 200 including an adjustable width drive axle 100 in accordance with exemplary embodiments is illustrated. The vehicle 200 includes a frame 202, the adjustable width drive axle 100, an adjustable width non-drive axle 204, and drive unit 206. In exemplary embodiments, the frame 202 may have a unitary construction or it may be comprised of several smaller pieces affixed to one another. The drive unit 206 is mounted on the frame 202 and is coupled to the adjustable width drive axle 100. In an exemplary embodiment, a drive chain is used to couple the drive unit 206 to the adjustable width drive axle 100.

The adjustable width non-drive axle 204, includes a braking system that is comprised of a brake line 208 couple to a brake mechanism 210. The break line 208 may be slidably affixed to the adjustable width non-drive axle 204 to accommodate the adjustment of the width of the non-drive axle 204. The adjustable width non-drive axle 204 includes a securement device, such as a bolt, that is used to fix the width of the non-drive axle 204.

The use of the spacers 120 on the adjustable width drive axle 100 allows the location of the sprocket 104 and the drive unit 206 to remain constant despite changes in the position of the wheels. The sprocket 104 receives rotational energy from the drive unit 206 and through the spacers 120, the wheel hub mount 114, and the wheel hub 112 transfers the rotational energy to the wheel mounted on the wheel hub 112 and the main axle body 102 affixed to the wheel hub mount. In exemplary embodiments, only one side of the adjustable width drive axle 100 may utilize spacers 120. The other side of the adjustable width drive axle 100 may receive rotational energy from the main axle body 102 which is coupled, on the opposite end, to the wheel hub 112 by nut 110.

In exemplary embodiments, a user may adjust the width of the drive axle by first affixing a sprocket, designed to engage a main drive unit, to the main axle body. Next, the user would affix a first spacer to the sprocket, the first spacer being disposed around the telescoping end portion of the main axle body. Finally, the user would affix a hub to the first spacer, wherein affixing the first spacer adjusts the width of the drive axle. Additionally, the user could further adjust the width of the drive axle by disconnecting the first spacer from the hub and affixing a second spacer to the hub and the first spacer, the second spacer disposed around the telescoping end portion of the main axle body. The first and second spacers may be of various lengths and in exemplary embodiments the length of the first spacer be equal to the length of the second spacer.

While the exemplary embodiments of the invention have been described, it will be understood that those skilled in the art, both now and in the future, may make various improvements and enhancements, which fall within the scope of the claims that follow. These claims should be construed to maintain the proper protection for the invention first described.

What is claimed is:

1. An adjustable width drive axle operable to support a frame, said adjustable width drive axle comprising:
    an adjustable width axle body including a first portion operable to be attached to the frame and a second shiftable portion that presents one of opposite axle ends and is axially shiftable relative to the first portion to adjust the width of the axle;
    a sprocket rotatably disposed on the axle body and positioned between the opposite ends at a sprocket location along the length of the axle body, with the sprocket being configured to drivingly engage a drive unit;
    a rotatable wheel hub assembly rotatably mounted on the one end of the axle body to be shiftable with the second portion of the axle body as the axle width is adjusted; and
    a plurality of spacers configured to be removably affixed in any spacer combination between the wheel hub assembly and sprocket,
    each of said sprocket, wheel hub assembly, and spacers including an axially extending main body with at least one radial attachment projection extending therefrom,
    said at least one attachment projection of each main body being connectable to the at least one attachment projection of the adjacent main body to thereby affix adjacent ones of the main bodies to one another,
    said rotatable wheel hub assembly drivingly removably affixed relative to the sprocket, with one or more of the spacers drivingly interconnecting the wheel hub assembly and the sprocket so that as the axle width is adjusted the sprocket is maintained in the sprocket location and driving power is transmitted between the wheel hub and the sprocket by the interconnected spacers.

2. The adjustable width drive axle of claim 1,
    said one or more spacers being positioned between the hub and sprocket and disposed around the shiftable portion of the axle body.

3. The adjustable width drive axle of claim 1,
    wherein the sprocket includes a plurality of teeth disposed about the circumference of the sprocket designed to engage a chain.

4. A method for adjusting a width of a drive axle comprising:
    providing an adjustable width axle body with a first portion and a second shiftable end portion that is axially shiftable relative to the first portion to adjust the width of the axle;
    rotatably disposing a sprocket, designed to engage a main drive unit, on the axle body at a sprocket location;
    adjusting the width of the axle by axially shifting the shiftable second end portion relative to the first portion;
    affixing a first spacer to the sprocket, the first spacer disposed around the shiftable end portion of the axle body;
    rotatably mounting a wheel hub assembly on the shiftable second end portion, with the wheel hub assembly being shiftable with the second end portion of the axle body as the axle width is adjusted;

providing each of the sprocket, wheel hub assembly, and first spacer with an axially extending main body having at least one radial attachment projection extending therefrom, with the at least one attachment projection of each main body being connectable to the at least one attachment projection of the adjacent main body to thereby affix adjacent ones of the main bodies to one another; and affixing the wheel hub assembly relative to the first spacer, wherein the steps of affixing the first spacer and affixing the wheel hub assembly maintain the sprocket in the sprocket location when the axle width is adjusted and drivingly interconnect the wheel hub assembly and sprocket to transmit driving power therebetween.

5. The method of claim 4, further comprising:

disconnecting the first spacer from the hub; and affixing a second spacer to the hub and the first spacer, the second spacer disposed around the shiftable end portion of the axle body.

6. The method of claim 5,
wherein a length of the first spacer is equal to a length of the second spacer.

7. The method of claim 5,
wherein the length of the first spacer is different than a length of the second spacer.

8. The adjustable width drive axle of claim 1,
said spacers each including two semi-tubular plates that encase the shiftable portion.

9. The adjustable width drive axle of claim 1,
said shiftable portion of the axle body comprising a telescoping portion.

10. The adjustable width drive axle of claim 1,
said plurality of spacers presenting different spacer lengths.

11. The adjustable width drive axle of claim 1,
said wheel hub assembly including a wheel hub and wheel hub mount fixed to one another.

\* \* \* \* \*